(12) United States Patent
Tong et al.

(10) Patent No.: US 8,564,265 B2
(45) Date of Patent: Oct. 22, 2013

(54) DRIVING CIRCUIT

(75) Inventors: Song-Lin Tong, Shenzhen (CN); Qi-Yan Luo, Shenzhen (CN); Peng Chen, Shenzhen (CN); Yun Bai, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 244 days.

(21) Appl. No.: 13/167,714

(22) Filed: Jun. 24, 2011

(65) Prior Publication Data

US 2012/0242306 A1    Sep. 27, 2012

(30) Foreign Application Priority Data

Mar. 24, 2011 (CN) .......................... 2011 1 0071938

(51) Int. Cl.
    G05F 1/575    (2006.01)
    G05F 1/59     (2006.01)
(52) U.S. Cl.
    USPC ........................................................ 323/282
(58) Field of Classification Search
    USPC ..................... 323/282, 284, 285, 286, 351
    See application file for complete search history.

(56) References Cited

U.S. PATENT DOCUMENTS

2006/0038546 A1* 2/2006 Lin et al. .................. 323/284
2010/0134080 A1* 6/2010 Ouyang .................... 323/282

* cited by examiner

Primary Examiner — Gary L Laxton
(74) Attorney, Agent, or Firm — Altis & Wispro Law Group, Inc.

(57) ABSTRACT

A driving circuit includes a switching circuit, an acquiring circuit, an amplifying circuit, and an adjusting circuit. The switching circuit includes a driving chip and a switching unit. The switching unit is connected between a power source and a load, the driving chip is configured for controlling the connection and disconnection of the switching unit. The acquiring circuit is connected between the switching unit and the load, and is configured for providing a feedback to the amplifying circuit. The amplifying circuit includes two amplifying input terminals connected to two terminals of the acquiring circuit and an amplifying output terminal outputting an amplified voltage. The adjusting circuit is connected to the amplifying output terminal and is configured for outputting different control voltages to the driving chip according to the amplified voltage. The driving chip outputs different driving voltages to the switching unit according to the control voltages.

8 Claims, 1 Drawing Sheet

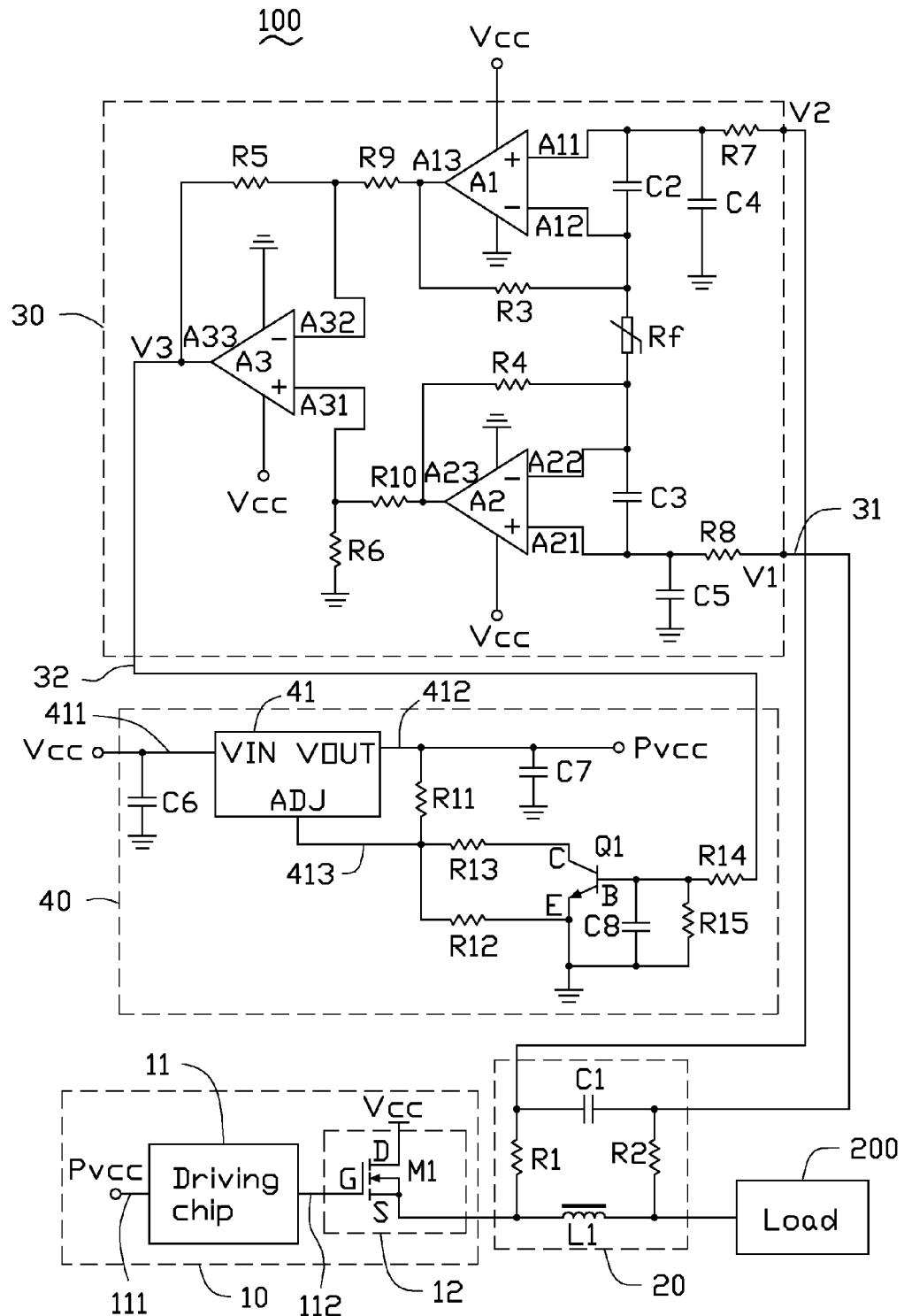

DRIVING CIRCUIT

BACKGROUND

1. Technical Field

The present disclosure relates to circuits, and particularly, to a driving circuit.

2. Description of Related Art

Driving circuits generally include a driving chip and at least one transistor. The driving chip is connected between a power source and the at least one transistor. The transistor is connected to a load. The driving chip is configured for controlling connection/disconnection of the power source to the load. The routine driving voltage of the driving chip is a constant value. However, when the load works at a lower power draw, the actual driving voltage could be lower than the routine driving voltage and the driving circuits waste power.

Therefore, it is desirable to provide a driving circuit which can overcome the limitations described above.

BRIEF DESCRIPTION OF THE DRAWING

The FIGURE is a circuit diagram of a driving circuit, according to an exemplary embodiment.

DETAILED DESCRIPTION

Exemplary embodiments of the disclosure will be described in detail, with reference to the accompanying drawing.

Referring to the drawing, a driving circuit 100 connected between a power source Vcc and a load 200, according to an exemplary embodiment is shown. The driving circuit 100 includes a switching circuit 10, an acquiring circuit 20, an amplifying circuit 30, and an adjusting circuit 40.

The switching circuit 10 includes a driving chip 11 and a switching unit 12. The switching unit 12 is connected between the power source Vcc and the load 200. The driving chip 11 is configured for controlling connection and disconnection of the switching unit 12. The driving chip 11 includes a voltage controlling terminal 111 and a driving terminal 112. The switching unit 12 includes a transistor M1. The transistor M1 includes a drain D, a source S, and a gate G. The drain D is connected to the power source Vcc. The source S is connected to the load 200. The gate G is connected to the driving terminal 112. The driving chip 11 is configured for outputting a driving voltage to the gate G of the transistor M1 to control connection and disconnection of the drain D to the source S. When the driving voltage is greater than a threshold voltage of the transistor M1, the drain D connects to the source S. It should be understood that the switching unit 12 can further includes a number of electrical elements to regulate the voltage of the source S.

The acquiring circuit 20 is connected between the switching unit 12 and the load 200, and is configured for providing a feedback to the amplifying circuit 30. The acquiring circuit 20 includes an inductor L1, a first resistor R1, a second resistor R2, and a first capacitor C1. The inductor L1 is connected between the source S of the transistor M1 and the load 200. The first resistor R1 includes a first terminal connected between the inductor L1 and the source S, and a second terminal. The second resistor R2 includes a first terminal connected between the inductor L1 and the load 200, and a second terminal. The first capacitor C1 is connected between the second terminal of the first resistor R1 and the second terminal of the second resistor R2.

The amplifying circuit 30 includes two amplifying input terminals 31 and an amplifying output terminal 32. One of the amplifying input terminals 31 is connected to the second terminal of the first resistor R1, and another amplifying input terminal 31 is connected to the second terminal of the second resistor R2. The amplifying circuit 30 includes a first amplifier A1, a second amplifier A2, a third amplifier A3, a slide rheostat Rf, a second capacitor C2, a third capacitor C3, a fourth capacitor C4, a fifth capacitor C5, a third resistor R3, a fourth resistor R4, a fifth resistor R5, a sixth resistor R6, a seventh resistor R7, an eighth resistor R8, a ninth resistor R9, and a tenth resistor R10. The first amplifier A1 includes a first positive input terminal A11, a first negative input terminal A12, and a first output terminal A13. The second amplifier A2 includes a second positive input terminal A21, a second negative input terminal A22, and a second output terminal A23. The third amplifier A3 includes a third positive input terminal A31, a third negative input terminal A32, and a third output terminal A33.

The slide rheostat Rf is connected between the first negative input terminal A12 and the second negative input terminal A22. The second capacitor C2 is connected between the first positive input terminal A11 and the first negative input terminal A12. The third capacitor C3 is connected between the second positive input terminal A21 and the second negative input terminal A22. One terminal of the fourth capacitor C4 is connected to the first positive input terminal A11, and another terminal of capacitor C4 is grounded. One terminal of the fifth capacitor C5 is connected to the second positive input terminal A21, and another terminal is grounded. The third resistor R3 is connected between the first output terminal A13 and the first negative input terminal A12. The fourth resistor R4 is connected between the second output terminal A23 and the second negative input terminal A22. The fifth resistor R5 is connected between the third output terminal A33 and the third negative input terminal A32. The sixth resistor R6 includes a first terminal connected the third positive input terminal A31 and a second terminal being grounded. The seventh resistor R7 is connected between the first positive input terminal A11 and the second terminal of the first resistor R1. The eighth resistor R8 is connected between the second positive input terminal A21 and the second terminal of the second resistor R2. The ninth resistor R9 is connected between the first output terminal A13 and the third negative input terminal A32. The tenth resistor R10 is connected between the second output terminal A23 and the third positive input terminal A31. The third output terminal A 33 serves as the amplifying output terminal 32, and the first positive input terminal A11 and the second positive input terminal A21 serve as the two amplifying input terminals 31 respectively.

The adjusting circuit 40 includes a voltage adjusting module 41, an eleventh resistor R11, a twelfth resistor R12, a thirteenth resistor R13, a fourteenth resistor R14, a fifteenth resistor R15, a sixth capacitor C6, a seventh capacitor C7, an eighth capacitor C8, and a bipolar junction transistor (BJT) Q1. The voltage adjusting module 41 includes a voltage input terminal 411, a voltage output terminal 412, and a feedback terminal 413. The voltage adjusting module 41 output a reference voltage Vadj from the feedback terminal 413. The voltage input terminal 411 is connected to the power source Vcc. The voltage output terminal 412 is connected to the voltage controlling terminal 111 of the driving chip 11. The eleventh resistor R11 is connected between the voltage output terminal 412 and the feedback terminal 413. One terminal of the twelfth resistor R12 is connected to the feedback terminal 413, and another terminal is grounded. The BJT Q1 includes a collector C, an emitter E, and a base B. When the voltage of the base B is greater than a threshold voltage of the BJT Q1, the collector C connects to the emitter E. The collector C is connected between the eleventh resistor R11 and the twelfth resistor R12 via the thirteenth resistor R13. The emitter E is grounded. The base B is connected to the third output terminal A33 via the fourteenth resistor R14. One terminal of the fifteenth resistor R15 is connected to the base B, and another terminal is grounded. One terminal of the sixth capacitor C6 is connected to the voltage input terminal 411, and another terminal is grounded. One terminal of the seventh capacitor C7 is connected to the voltage output terminal 412, and another terminal is grounded. One terminal of the eighth capacitor C8 is connected to the base B, and another terminal is grounded.

In use, the driving chip 11 outputs a driving voltage greater than the threshold voltage to the gate G of the transistor M1. The drain D connects to the source S, and the power source Vcc supplies power to the load 200. The input terminals 31 respectively acquire a first voltage V1 and a second voltage V2 from the two terminals of the inductor L1. The first voltage V1 and the second voltage V2 are input from the first positive terminal A11 and the second positive terminal A21 and amplified by the first, second, third amplifiers A1, A2, A3. The third amplifier A3 outputs a third voltage V3 from the third output terminal A33. The value of the third voltage V3 changes according to the power consumption of the load 200. When the load 200 works at a lower power draw, the third voltage V3 is a low level; when the load 200 works at a higher power draw, the third voltage V3 is a high level.

The voltage adjusting module 41 outputs different control voltages Pvcc from the voltage output terminal 412 according to the third voltage V3. When the third voltage V3 is lower than the threshold voltage of the BJT Q1, the thirteenth resistor R13 is not electrically connected to the feedback terminal 413. The voltage adjusting module 41 outputs one control voltage Pvcc from the voltage output terminal 412 equal to Vadj*(R11+R12)/R12. When the third voltage V3 is greater than the threshold voltage of the BJT Q1, the thirteenth resistor R13 is connected with the twelfth resistor R12 in parallel. The voltage adjusting module 41 outputs another control voltage Pvcc from the voltage output terminal 412 equal to Vadj*(R11+R12//R13)/R12//R13.

The driving chip 11 is configured for outputting different driving voltages to the gate G of the transistor M1 according to the control voltage Pvcc input from the voltage controlling terminal 111. When the value of the control voltage Pvcc is equal to Vadj*(R11+R12)/R12, the driving chip 11 outputs a first driving voltage from the driving terminal 112. When the value of the control voltage Pvcc is equal to Vadj*(R11+R12//R13)/R12//R13, the driving chip 11 outputs a second driving voltage from the driving terminal 112. The second driving voltage will be greater than the first driving voltage.

It will be understood that particular exemplary embodiments are shown and described by way of illustration only. The principles and the features of the present disclosure may be employed in various and numerous exemplary embodiments thereof without departing from the scope of the disclosure as claimed. The above-described exemplary embodiments illustrate the scope of the disclosure but do not restrict the scope of the disclosure.

What is claimed is:

1. A driving circuit, comprising:
    a switching circuit comprising a driving chip and a switching unit, the switching unit connected between a power source and a load, the driving chip configured for controlling connection and disconnection of the switching unit;
    an acquiring circuit connected between the switching unit and the load, and configured for providing a feedback to an amplifying circuit;
    the amplifying circuit comprising two amplifying input terminals respectively connected to two terminals of the acquiring circuit, and an amplifying output terminal outputting an amplified voltage according to the feedback; and
    an adjusting circuit connected to the amplifying output terminal and configured for outputting different control voltages to the driving chip according to the amplified voltage, the driving chip outputting different driving voltages to switch on the switching unit according to the different control voltages;
    wherein the adjusting circuit comprises a voltage adjusting module, an eleventh resistor, a twelfth resistor, a thirteenth resistor, and a BJT; the voltage adjusting module comprises a voltage input terminal connected to the power source, a voltage output terminal connected to the driving chip, and a feedback terminal; the eleventh resistor is connected between the voltage output terminal and the feedback terminal; one terminal of the twelfth resistor is connected to the feedback terminal, and another terminal is grounded; the BJT comprises a collector connected between the eleventh resistor and the twelfth resistor via the thirteenth resistor, an emitter being grounded, and a base connected to the amplifying output terminal.

2. The driving circuit in claim 1, wherein the switching unit comprises a transistor, the transistor comprises a drain connected to the power source, a source connected to the load via the acquiring circuit, and a gate connected to the driving chip.

3. The driving circuit in claim 2, wherein the driving chip comprises a voltage controlling terminal connected to the adjusting circuit and a driving terminal connected to the gate.

4. The driving circuit in claim 3, wherein the acquiring circuit comprises an inductor connected between the source and the load.

5. The driving circuit in claim 4, wherein the acquiring circuit further comprises a first resistor, a second resistor, and a first capacitor; the first resistor comprises a first terminal connected between the inductor and the source and a second terminal; the second resistor comprises a first terminal connected between the inductor and the load and a second terminal; the first capacitor is connected between the second terminal of the first resistor and the second terminal of the second resistor.

6. The driving circuit in claim 5, wherein the amplifying circuit comprises a first amplifier, a second amplifier, a third amplifier, and a slide rheostat; the first amplifier comprises a first positive input terminal, a first negative input terminal, and a first output terminal; the second amplifier comprises a second positive input terminal, a second negative input terminal, and a second output terminal; the third amplifier comprises a third positive input terminal, a third negative input terminal, and a third output terminal; the slide rheostat is connected between the first negative input terminal and the second negative input terminal; the first output terminal is connected to the third negative input terminal; the second output terminal is connected to the third positive input terminal; the third output terminal serves as the amplifying output terminal, the first positive input terminal and the second positive input terminal serve as the two amplifying input terminals.

7. The driving circuit in claim 6, wherein the amplifying circuit further comprises a second capacitor, a third capacitor, a third resistor, a fourth resistor, a fifth resistor, and a sixth resistor; the second capacitor is connected between the first positive input terminal and the first negative input terminal; the third capacitor is connected between the second positive input terminal and the second negative input terminal; the third resistor is connected between the first output terminal and the first negative input terminal; the fourth resistor is connected between the second output terminal and the second negative input terminal; the fifth resistor is connected between the third output terminal and the third negative input terminal; one terminal of the sixth resistor is connected to the third positive input terminal, and another terminal is grounded.

8. The driving circuit in claim 7, wherein the amplifying circuit further comprises a seventh resistor, a eighth resistor, a ninth resistor, a tenth resistor, a fourth capacitor, and a fifth capacitor; the seventh resistor is connected between the first positive input terminal and second terminal of the first resistor; the eighth resistor is connected between the second positive input terminal and the second terminal of the second resistor; the ninth resistor is connected between the first output terminal and the third negative input terminal; the tenth resistor is connected between the second output terminal and the third positive input terminal; one terminal of the fourth capacitor is connected to the first positive input terminal, and another terminal is grounded; one terminal of the fifth capacitor is connected to the second positive input terminal, and another terminal is grounded.

* * * * *